United States Patent
Wilhelmsson et al.

(10) Patent No.: US 10,939,372 B2
(45) Date of Patent: Mar. 2, 2021

(54) WAKE-UP SIGNAL TRANSMISSION

(71) Applicant: Telefonaktiebolaget LM Ericsson (publ), Stockholm (SE)

(72) Inventors: Leif Wilhelmsson, Lund (SE); Miguel Lopez, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/479,249

(22) PCT Filed: Dec. 5, 2017

(86) PCT No.: PCT/EP2017/081531
§ 371 (c)(1),
(2) Date: Jul. 19, 2019

(87) PCT Pub. No.: WO2018/149531
PCT Pub. Date: Aug. 23, 2018

(65) Prior Publication Data
US 2019/0387469 A1   Dec. 19, 2019

Related U.S. Application Data

(60) Provisional application No. 62/460,206, filed on Feb. 17, 2017.

(51) Int. Cl.
*H04W 52/02* (2009.01)
(52) U.S. Cl.
CPC ... *H04W 52/0206* (2013.01); *H04W 52/0229* (2013.01)
(58) Field of Classification Search
CPC ............. H04W 52/02; H04W 52/0206; H04W 52/0229
(Continued)

(56) References Cited

U.S. PATENT DOCUMENTS 9,477,292 B1 * 10/2016 Murali ................. G06F 9/4418
10,123,266 B2    11/2018 Wang et al.
(Continued)

FOREIGN PATENT DOCUMENTS

EP   1270347 A2   1/2003
RU   2014140182 A   4/2016

OTHER PUBLICATIONS

Park, M. et al., "WUR Phase Noise Model Study", Submission, IEEE 802.11-17/0026r0, Jan. 10, 2017, pp. 1-12, IEEE.
(Continued)

*Primary Examiner* — Candal Elpenord
(74) *Attorney, Agent, or Firm* — Coats + Bennett, PLLC (57) ABSTRACT

A method of a network node adapted to transmit a wake-up signal for waking up one or more wireless communication receivers is disclosed, as well as a method for the wireless communication receiver, such network node and wireless communication receiver, and computer programs for implementing the methods. Each wireless communication receiver is comprised in a wireless communication device and is associated with a wake-up radio adapted to wake up the wireless communication receiver in response to detecting the wake-up signal. An indication of a maximum frequency error of the wake-up radio associated with the wireless communication receiver is acquired such that a non-data transmission bandwidth for exclusive use by the wake-up signal can be determined. The wake-up signal is transmitted over a wake-up signal transmission frequency interval having a wake-up signal transmission bandwidth, wherein the wake-up signal transmission bandwidth is less than, or equal to, the non-data transmission bandwidth. The method of the wireless communication receiver comprises transmitting a message to the network node indicative of a maximum frequency error of the wake-up radio, wherein the maximum frequency error is for determination by the net-
(Continued)

work node of a non-data transmission bandwidth for the exclusive use by the wake-up signal.

22 Claims, 3 Drawing Sheets

(58) Field of Classification Search
USPC .......................................................... 370/311
See application file for complete search history.

(56) References Cited

U.S. PATENT DOCUMENTS

| | | |
|---|---|---|
| 2003/0117969 A1* | 6/2003 | Koo ...................... H04W 76/27 370/318 |
| 2007/0060095 A1 | 3/2007 | Subrahmanya et al. |
| 2012/0122401 A1 | 5/2012 | Aunkofer et al. |
| 2015/0088278 A1* | 3/2015 | Chang ................... G06F 1/3209 700/40 |
| 2017/0214567 A1* | 7/2017 | Salkintzis ........... H04W 52/146 |
| 2017/0332327 A1* | 11/2017 | Fang ..................... H04L 5/0007 |
| 2019/0320389 A1* | 10/2019 | Alanen ................. H04L 5/0091 |

OTHER PUBLICATIONS

Wilhelmsson, L. et al., "Concurrent Transmission of Data and a Wake-Up Signal in 802.11ax", Submission, IEEE 802.11-17/0094r1, Jan. 15, 2017, pp. 1-11, IEEE.

* cited by examiner

FIG. 7

WAKE-UP SIGNAL TRANSMISSION

TECHNICAL FIELD

The present invention relates generally to the field of wireless communication. More particularly, it relates to transmission of wake-up signals in wireless communication systems.

BACKGROUND

Internet of Things (IoT) is currently expected to increase the number of connected devices significantly. Many of these devices will likely operate in unlicensed bands (e.g., the 2.4 GHz industrial, scientific and medical—ISM— band). There is also an increased demand for using the unlicensed bands for services that have traditionally been supported in licensed bands. For example, the third generation partnership project (3GPP) that traditionally develops standard specifications for licensed bands have now developed standard specifications where versions of UMTS-LTE (Universal Mobile Telecommunication Standard, Long Term Evolution) operate in the 5 GHz unlicensed band. Thus, the unlicensed frequency bands may be expected to accommodate communication in relation to an increasing amount of devices as well as services.

It is often a desire in relation to wireless communication devices to reduce power consumption. The need to reduce power consumption is often particularly pronounced for wireless communication devices associated with IoT. This is due to that the power supply for IoT devices may, typically, depend on low energy batteries that are seldom or never charged or replaced and/or on energy harvested by the device itself (e.g. solar energy). Furthermore, supported data rates (typically both peak and average values) are often low for IoT applications. Thus, a substantial part of the power is consumed not when the IoT device is transmitting or receiving data, but when the device is in a listening mode to determine whether or not there is a signal for which it is the intended receiver. These conditions (low data rate and limited power supply) motivate using a wake-up radio (WUR), also commonly referred to as a wake-up receiver.

A WUR is a device which has lower power consumption than a main receiver that it is associated with, and whose only purpose is to wake up the main receiver when suitable. Hence, a device having a WUR will not need to turn on its main receiver to scan for potential signals intended for it since such scanning may be performed by the WUR under certain conditions. Typically, such conditions include a wake-up signal (WUS) being sent in advance of a signal intended for a main receiver. Then, the WUR can detect that there is a signal for the main receiver to receive by detecting the WUS. When the WUR determines, based on WUS detection, that there is a signal intended for the main receiver, it wakes up the main receiver (and possibly a corresponding transmitter) and a communication link can be established for reception of the signal. The potential of the WUR concept has, for example, been recognized within the IEEE 802.11 standardization community.

One concern with using the WUR concept is that the WUS transmissions may severely impact the system capacity since channel resources used for WUS can, typically, not be used for data transmissions. This problem may be at least partly mitigated by application of concurrent transmission of WUS and data, e.g. using OFDM (orthogonal frequency division multiplexing) or OFDMA (orthogonal frequency division multiple access) where the WUS is sent on some sub-carriers and data is sent on other subcarriers. Since data is multiplexed with WUS according to this approach, the channel resources are more efficiently used and system capacity may be improved compared to an approach where the WUS is transmitted non-concurrently with data. A further advantage of concurrent transmission of the WUS and data compared to an approach where the WUS is transmitted non-concurrently with data is that devices potentially interfering with the WUS transmission and using some kind of carrier sense multiple access with collision avoidance (CSMA/CA) are more likely to find the channel busy and defer from initiating interfering transmissions. Concurrent transmission of the WUS and data also provides a co-existence mechanism for the WUR approach with legacy approaches (e.g. in IEEE 802.11).

In concurrent transmission of WUS and data, any possible interference caused by the WUS to the reception of the data may be made negligible if the WUS is made orthogonal to the data transmissions (e.g. by using OFDM/OFDMA). However, the data transmissions may interfere with the WUS reception of the WUR. One reason for this is that due to the constraints of the WUR design (e.g. low power consumption) the WUR typically cannot perfectly separate the WUS from the data as a more elaborate receiver (e.g. using conventional OFDM demodulation) would be able to. For example, due to the constraints of the WUR design it may be difficult (or even impossible) to generate a precise frequency reference for the WUS reception, which may lead to the WUS reception being interfered by the data transmitted concurrently as will be explained later herein. Furthermore, the reception range of a WUR is often considerably smaller than for a main receiver. This problem may be at least partly mitigated by using a lower symbol rate for the WUS than for the data. Thus, the WUR performance is typically substantially inferior to that of a main receiver, both in terms of sensitivity and selectivity.

Therefore, there is a need for solutions for removing (or at least suppressing) interference to the WUS reception caused by data transmitted concurrently with the WUS.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It should also be noted that the scenarios described herein (e.g. in relation to IEEE 802.11) are merely illustrative examples and are by no means intended as limiting. Contrarily, embodiments may be applicable in any scenario where a transmitter is adapted to transmit both wake-up signals and data.

Compared to the design of a main receiver, designing a WUR may allow for more variations when it comes to the choice of architecture. An example thereof relates to the accuracy of the reference frequency generation, as mentioned above. For example, one architecture may use very relaxed reference frequency requirements to achieve very low power consumption. Such an architecture will typically not be able to exclude any concurrently transmitted data by filtering prior to the WUS detection part of the WUR. Another example architecture may, contrarily, prioritize performance over very low power consumption and consequently support a more accurate reference frequency generation. Such an architecture will typically be able to exclude at least some concurrently transmitted data by filtering prior to the WUS detection part of the WUR.

Depending on what characteristics the WUR has (e.g. the ability to filter out concurrently transmitted data) different approaches for multiplexing the WUS with data may be used. Therefore, there is also a need for support of a variation of solutions for removing (or at least suppressing) interference to the WUS reception caused by data transmitted concurrently with the WUS.

It is an object of some embodiments to solve or mitigate at least some of the above or other disadvantages.

According to a first aspect, this is achieved by a method of a network node adapted to transmit a wake-up signal (having a wake-up signal bandwidth) for waking up one or more wireless communication receivers. Each of the one or more wireless communication receivers is comprised in a wireless communication device and is associated with a wake-up radio adapted to wake up the wireless communication receiver in response to detecting the wake-up signal.

The method comprises acquiring (for at least one of the wireless communication devices) an indication of a maximum frequency error of the wake-up radio associated with the wireless communication receiver comprised in the wireless communication device, and determining (based on the maximum frequency error) a non-data transmission bandwidth for exclusive use by the wake-up signal.

The method also comprises transmitting the wake-up signal over a wake-up signal transmission frequency interval having a wake-up signal transmission bandwidth. The wake-up signal transmission bandwidth is less than, or equal to, the non-data transmission bandwidth.

In the context of IEEE 802.11 for example, the network node may be an access point (AP) and each of the wireless communication devices may be a station (STA).

Generally, a wireless communication device may comprise one or more wireless communication receivers and a wake-up radio may be associated with one or more wireless communication receivers. In one example, a wireless communication device may comprise exactly one wireless communication receiver having a wake-up radio associated with it. In another example, a wireless communication device may comprise a plurality of wireless communication receivers, each having a different wake-up radio associated with it. In yet another example, a wireless communication device may comprise a plurality of wireless communication receivers and one or more wake-up radio, wherein at least one of the wake-up radios is associated with more than one of the wireless communication receivers.

According to some embodiments, the method may further comprise transmitting an information signal to the at least one wireless communication device, the information signal indicating the non-data transmission bandwidth.

In some embodiments, acquiring the indication of the maximum frequency error may comprise receiving (from the at least one of the wireless communication devices) a message indicative of the maximum frequency error. The message may be received as part of any suitable signaling from the wireless communication device to the network node, or the message may be received in the form of separate signaling from the wireless communication device to the network node. For example, the message may be received as part of signaling specifying capabilities of the wireless communication device. Such signaling may, for example, take place when the wireless communication device registers with the network node. In some embodiments, the method may further comprise transmitting a request for the message indicative of the maximum frequency error. Then, the message may be received in response thereto.

According to some embodiments, determining the non-data transmission bandwidth based on the maximum frequency error may comprise determining the non-data transmission bandwidth to be equal to, or larger than, the wake-up signal bandwidth plus four times the maximum frequency error. More generally, the non-data transmission bandwidth may, in some embodiments, be determined to be equal to, or larger than, twice a bandwidth of a receiver filter of the wake-up radio minus the wake-up signal bandwidth. In some embodiments, the non-data transmission bandwidth may be determined to be equal to, or larger than, the bandwidth of a receiver filter of the wake-up radio plus twice the maximum frequency error.

The method may, according to some embodiments, further comprise transmitting data concurrently with the wake-up signal if the non-data transmission bandwidth is smaller than a total transmission bandwidth applied by the network node. In some embodiments, the method may also comprise transmitting the wake-up signal non-concurrently if the non-data transmission bandwidth is not smaller than the total transmission bandwidth applied by the network node.

The method may, according to some embodiments, further comprise transmitting data concurrently with the wake-up signal, wherein the concurrent transmission is based on an assumption that the data cannot be excluded by filtering prior to WUS detection.

Concurrent transmission of data and the wake-up signal may, for example, be achieved by using OFDM where the wake-up signal is allocated one or more resource units (RU) or one or more subcarriers, and is modulated using on-off keying (OOK; which is a special case of amplitude shift keying—ASK). The total transmission bandwidth applied by the network node may, for example, refer to an OFDM bandwidth currently applied by the network node. A wake-up radio lacking OFDM demodulation possibilities may typically perceive such an OFDM signal comprising an OOK-modulated wake-up signal as an ASK-modulated wake-up signal subject to possible noise caused by the data.

The wake-up signal bandwidth is typically equal to, or smaller than, the wake-up signal transmission bandwidth. When the wake-up signal bandwidth is smaller than the wake-up signal transmission bandwidth, the method may further comprise expanding the wake-up signal to the wake-up signal transmission bandwidth before transmission. Such expansion may be performed in any suitable way. For example, if an inverse fast Fourier transfer (IFFT) is applied for generation of an OFDM signal, the wake-up signal may be applied to a number of input taps of the IFFT corresponding to the wake-up signal transmission bandwidth.

If the wake-up signal transmission bandwidth is equal to the non-data transmission bandwidth, the method may comprise transmitting the wake-up signal over the entire non-data transmission bandwidth.

If the wake-up signal transmission bandwidth is less than the non-data transmission bandwidth, the method may further comprise allocating guard bands (precluding signal transmission) on respective sides of the wake-up signal transmission frequency interval. Each guard band has a bandwidth, wherein the bandwidths of the guard bands plus the wake-up signal transmission bandwidth equals the non-data transmission bandwidth. Typically, but not necessarily, the two guard bands have equal widths.

Thus, the WUS initially has a wake-up signal bandwidth and a non-data transmission bandwidth is determined. Either the WUS may be transmitted with its initial bandwidth (the wake-up signal transmission bandwidth being equal to the wake-up signal bandwidth) or the WUS may be transmitted in an expanded version (the wake-up signal transmission bandwidth being greater than the wake-up signal bandwidth). In any case, if the wake-up signal transmission bandwidth is less than the non-data transmission bandwidth, guard bands may be used to fill up the non-data transmission bandwidth.

In some embodiments, acquiring the indication may comprise acquiring a plurality of indications of respective (possibly different) maximum frequency errors of respective wake-up radios. Then, determining the non-data transmission bandwidth may comprise selecting the largest one of the respective maximum frequency errors and determining the non-data transmission bandwidth based on the selected maximum frequency error. These embodiments may be particularly beneficial if the wake-up signal is intended for several wake-up radios.

The maximum frequency error may be indicated in any suitable way. For example, indication may be via one or more of:
- a maximum frequency deviation of a local oscillator of the wake-up radio,
- a frequency accuracy metric of the wake-up radio,
- a filtering bandwidth of the wake-up radio,
- a minimum required bandwidth of the guard bands,
- a minimum required wake-up signal bandwidth expansion,
- a minimum required non-data transmission bandwidth, and
- a minimum required number of resource units (e.g. for non-data transmission bandwidth).

Example units that may be used to measure or denote frequency related quantities (such as bandwidths, frequency intervals and frequency errors) include, but are not limited to: Hertz (Hz), sub-carriers of OFDM, and resource units.

A second aspect is a wireless communication device adapted to receive a wake-up signal from a network node for waking up a wireless communication receiver comprised in the wireless communication device. The wireless communication receiver is associated with a wake-up radio comprised in the wireless communication device and adapted to wake up the wireless communication receiver in response to detecting the wake-up signal.

The method comprises transmitting (to the network node) a message indicative of a maximum frequency error of the wake-up radio, wherein the maximum frequency error is for determination by the network node of a non-data transmission bandwidth for exclusive use by the wake-up signal.

In some embodiments, the method may further comprise receiving (from the network node) a request for the message indicative of the maximum frequency error, and the message may be transmitted in response thereto.

According to some embodiments, the method may further comprise receiving an information signal from the network node, the information signal indicating the non-data transmission bandwidth, and adapting one or more wake-up radio parameters based on the non-data transmission bandwidth. Adaptation may, for example, comprise selecting one of a plurality of available wake-up radios, wherein the wake-up radios have different wake-up radio parameter values, and/or selecting a wake-up radio parameter setting for a wake-up radio. The wake-up radio parameters may, for example, relate to one or more of a power consumption, a maximum frequency error, and a filter bandwidth.

In some embodiments, the method may further comprise receiving the wake-up signal in a wake-up signal transmission frequency interval having a wake-up signal transmission bandwidth, wherein the wake-up signal transmission bandwidth is less than, or equal to, the non-data transmission bandwidth.

A third aspect is a computer program product comprising a computer readable medium, having thereon a computer program comprising program instructions, the computer program being loadable into a data-processing unit and adapted to cause execution of the method according to any of the first and second aspect when the computer program is run by the data-processing unit.

A fourth aspect is an arrangement for a network node adapted to transmit a wake-up signal (having a wake-up signal bandwidth) for waking up one or more wireless communication receivers. Each of the one or more wireless communication receivers is comprised in a wireless communication device and is associated with a wake-up radio adapted to wake up the wireless communication receiver in response to detecting the wake-up signal.

The arrangement comprises a controller adapted to cause acquiring (for at least one of the wireless communication devices) of an indication of a maximum frequency error of the wake-up radio associated with the wireless communication receiver comprised in the wireless communication device, and determination (based on the maximum frequency error) of a non-data transmission bandwidth for exclusive use by the wake-up signal. The controller is also adapted to cause transmission of the wake-up signal over a wake-up signal transmission frequency interval having a wake-up signal transmission bandwidth, wherein the wake-up signal transmission bandwidth is less than, or equal to, the non-data transmission bandwidth.

The arrangement may be circuitry of the network node.

A fifth aspect is a network node comprising the arrangement according to the fourth aspect.

A sixth aspect is an arrangement for a wireless communication device adapted to receive a wake-up signal from a network node for waking up a wireless communication receiver comprised in the wireless communication device. The wireless communication receiver is associated with a wake-up radio comprised in the wireless communication device and adapted to wake up the wireless communication receiver in response to detecting the wake-up signal.

The arrangement comprises a controller adapted to cause transmission (to the network node) of a message indicative of a maximum frequency error of the wake-up radio, wherein the maximum frequency error is for determination by the network node of a non-data transmission bandwidth for exclusive use by the wake-up signal.

The arrangement may be circuitry of the wireless communication device.

A seventh aspect is a wireless communication device comprising the arrangement according to the sixth aspect.

In some embodiments, any of the above aspects may additionally have features identical with or corresponding to any of the various features as explained above for any of the other aspects.

An advantage of some embodiments is that interference to the WUS reception caused by data transmitted concurrently with the WUS is minimized (or at least decreased compared to some other approaches to concurrent transmission of WUS and data).

Another advantage of some embodiments is that efficient use of the available spectrum is provided (via use of concurrent transmission) as well as reliable WUS reception (via application of a suitable non-data transmission bandwidth).

Suitability of the non-data transmission bandwidth is dynamically determined to fit the maximum frequency error of the particular WUR that the WUS is intended for, according to some embodiments, which leads to more efficient use of the available spectrum than if a static worst case non-data transmission bandwidth would be applied.

Some embodiments also provide for a WUS transmission being intended for several WUR:s. If some of these WUR:s have different maximum frequency errors the largest frequency error may be selected as a basis for determining the suitable non-data transmission bandwidth. This provides for reliable WUS detection by all of the WUR:s under consideration.

A further advantage of some embodiments is that different WUR architectures may efficiently and reliably co-exist.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a network node acquires an indication of a maximum frequency error of a wake-up radio (WUR) associated with a wireless communication receiver comprised in a wireless communication device. The network node determines a non-data transmission bandwidth based on the maximum frequency error. The non-data transmission bandwidth is for exclusive use by a wake-up signal (WUS) intended for the WUR and the WUR is adapted to wake up the wireless communication receiver in response to detecting the WUS. The WUS is transmitted by the network node over a wake-up signal transmission frequency interval having a wake-up signal transmission bandwidth which is less than, or equal to, the non-data transmission bandwidth. This approach provides for using the frequency resources efficiently conditioned on reliable WUS reception.

In some embodiments when the WUS transmission is for several WUR:s associated with different maximum frequency errors, the network node selects the largest maximum frequency error and proceeds based on the selection. This approach provides for using the frequency resources efficiently conditioned on reliable WUS reception in all involved WUR:s.

Figure 1:
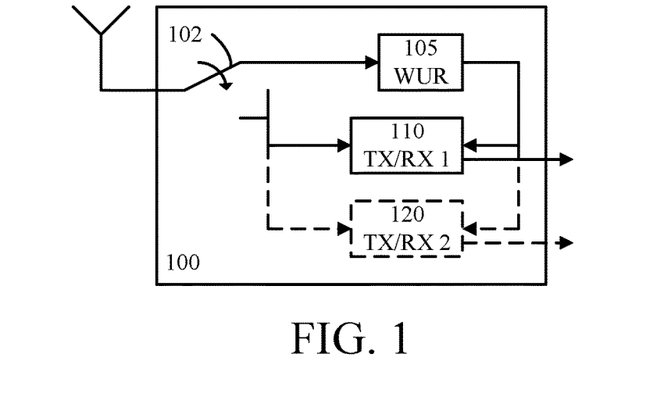
FIG. 1 is a schematic block diagram illustrating parts of an example wireless communication device according to some embodiments.

FIG. 1 schematically illustrates an example architecture 100 for a wireless communication device comprising a wake-up radio (WUR) 105. The architecture also comprises one or more main transceivers (TX/RX 1, TX/RX 2) 110, 120. Each main transceiver may, for example, correspond to a respective reception/transmission standard. In this example, both main transceivers are associated with the same WUR.

Starting in an idle mode, the switch 102 will be in the location indicated in FIG. 1, conveying the antenna signal to the WUR, while the main transceivers are in respective sleep modes. The WUR scans for the WUS for each of the main transceivers, and when the WUR detects a valid WUS it wakes up the corresponding main transceiver and causes the switch 102 to shift position so that the antenna signal is conveyed to the main transceiver instead of to the WUR. Then, the woken-up main transceiver communicates as standardized until it enters sleep mode again and causes the switch 102 to shift position to the location indicated in FIG. 1.

It is to be understood that the example of FIG. 1 is simplified for illustrative purposes and does not necessarily represent a realistic implementation. For example, in FIG. 1 a single antenna is illustrated as being used for the WUR and the different main transceivers, and a switch is used to illustrate whether or not only the WUR is active. In other embodiments, the main transceivers may have different antennas (e.g. due to operation in different frequency bands) and/or the WUR may have a separate antenna, and no switch may be necessary.

As indicated above, the WUR design is typically subject to a trade-off between (very) low power consumption and reception performance. For example, having an OFDM-demodulator in a WUR, which might improve performance, is typically not possible given the requirements of low power consumption for the WUR. Furthermore, requirements of low power consumption may impact the accuracy of a frequency reference generation in the WUR.

Figure 2:
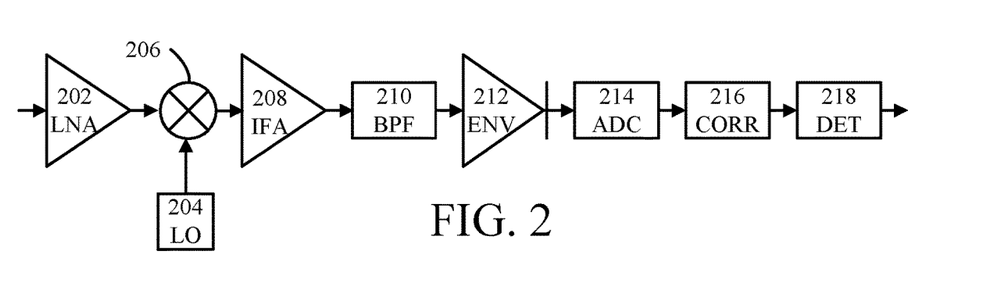
FIG. 2 is a schematic block diagram illustrating an example wake-up radio according to some embodiments.

FIG. 2 schematically illustrates an example WUR architecture according to some embodiments. The received signal, comprising a WUS and possibly interfering signals such as data transmitted concurrently with the WUS, is input to a low noise amplifier (LNA) 202. The signal output from the LNA is mixed (down-converted) by mixer 206 using a reference frequency generated by a local oscillator (LO) 204. As mentioned above, the accuracy of the reference frequency generation of the local oscillator 204 may depend on the power consumption requirements the WUR is to adhere to, such that a stricter power consumption requirement typically leads to lower reference frequency accuracy.

In the example architecture of FIG. 2, the down-conversion in mixer 206 is to an intermediate frequency (IF) and the down-converted signal is input to an intermediate frequency amplifier (IFA) 208. After amplification, the down-converted signal is input to a band pass filer (BPF) 210 for filtering out the WUS. The bandwidth of the pass band of the filter 210 depends on the accuracy of the reference frequency. To be certain that the pass band of the filter captures the WUS, the pass band width must be at least the bandwidth of the WUS plus twice the maximum deviation of the reference frequency.

The filtered signal is then input to an envelope detector (ENV) 212 in the example architecture of FIG. 2. Then, the signal is converted to the digital domain in the analog-to-digital converter (ADC) 214, and the WUS is detected by correlation using a correlator (CORR) 216 and a peak detector (DET) 218.

That a filter bandwidth depends on an accuracy of the reference frequency (which in turn may depend on a power consumption requirement) such that lower reference frequency accuracy gives larger filter bandwidth, is a general observation applicable not only to the example WUR architecture of FIG. 2.

Depending on a power consumption requirement of the WUR, a corresponding WUR architecture may be selected. The power consumption requirements, and thereby the WUR architecture (including the frequency reference accuracy), may differ between different WUR:s and different wireless communication devices. A network node transmitting a WUS typically needs to accommodate the different frequency reference accuracies. One possibility is to design WUS transmission according to a worst case scenario, which typically leads to poor efficiency regarding utilization of frequency resources (e.g. non-concurrent WUS transmission). Furthermore, in such an approach the higher power consumption WUR architectures will be wasting power without any (or with very small) performance gain.

Another possibility for the network node to accommodate the different frequency reference accuracies is provided by embodiments of the invention, where the network node dynamically adapts the bandwidth used exclusively by the WUS based on the maximum frequency accuracy of the WUR that the WUS is intended for.

Figure 3:
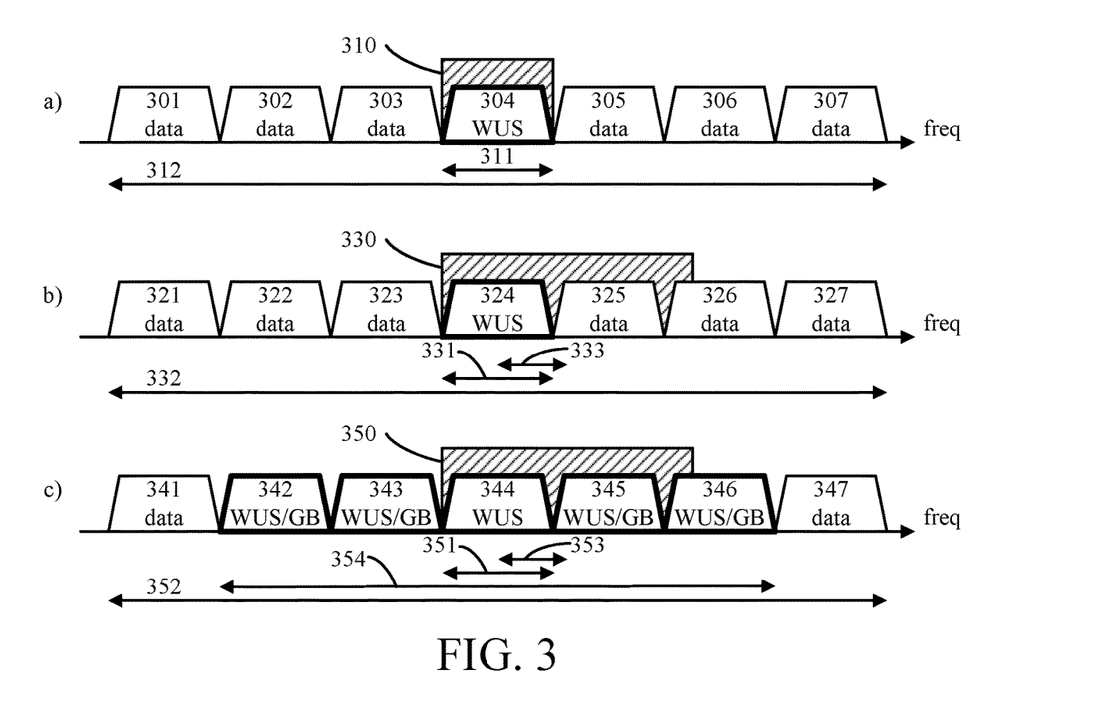
FIG. 3 is a schematic drawing illustrating example frequency intervals and bandwidths according to some embodiments.

FIG. 3 schematically illustrates an example frequency domain scenario where embodiments may be applicable. In this scenario, the WUS is transmitted concurrently with data using an OFDM approach where a total transmission bandwidth 312, 332, 352 applied by the network node is divided into resource units (RU:s). As mentioned above, the data is typically not interfered by the WUS due to OFDM-demodulation used for data reception, while the data may cause interference to WUS reception in a WUR as will be illustrated by this example.

Part a) illustrates concurrent transmission of the WUS (which has a WUS bandwidth 311) in a RU 304 and data in the other RU:s 301, 302, 303, 305, 306, 307 of the total transmission bandwidth 312. An ideal WUR generating an accurate reference frequency may be able to capture the WUS by a band pass filter (illustrated by the schematic pass band 310) without being interfered by the data. However, as elaborated on above, a WUR is typically not generating an accurate reference frequency.

Part b) also illustrates concurrent transmission of the WUS (which has a WUS bandwidth 331) in a RU 324 and data in the other RU:s 321, 322, 323, 325, 326, 327 of the total transmission bandwidth 332. In this part of FIG. 3, it is assumed that the WUR has a reference frequency error. This is illustrated in that the center frequency of the band pass filter (illustrated by the schematic pass band 330) is shifted by an amount 333 corresponding to a maximum reference frequency error. To be able to capture the WUS by the band pass filter the pass band 330 needs to be widened compared to the ideal situation of part a). Considering that the frequency error may be either positive or negative, the width of the pass band 330 needs to be at least the WUS bandwidth plus twice the maximum reference frequency error. From the illustration in part b) of FIG. 3 it is clear that this widening of the pass band 330 leads to that all data is not filtered out by the band pass filter. In the particular situation of part b), the WUS reception will experience interference from the data transmitted in RU:s 325 and (partly) 326.

Part c) also illustrates concurrent transmission of WUS and data, but now in accordance to some embodiments to solve the above-identified problem. The WUS (which has a WUS bandwidth 351) is transmitted in a RU 344, and it is assumed that the WUR has the same maximum reference frequency error as in part b). This is illustrated in that the center frequency of the band pass filter (illustrated by the schematic pass band 350, corresponding to 330) is shifted by an amount 353 corresponding to the maximum reference frequency error. Considering that the frequency error may be either positive or negative, RU:s 342, 343, 345 and 346 are determined to be for exclusive use by the WUS to avoid data from interfering with the WUS reception. Thus data transmission is only allowed outside of a non-data transmission bandwidth 354; in RU:s 341 and 347.

The RU:s 342, 343, 345 and 346 may comprise a frequency expanded version of the WUS, guard bands (no signaling), or a combination thereof. For example, a frequency expanded version of the WUS may be transmitted in RU:s 343, 344 and 345 and RU:s 342 and 346 may be used as guard bands. In another example, a frequency expanded version of the WUS may be transmitted in RU:s 342, 343, 344, 345 and 346 and no RU:s are used as guard bands. This is a feasible solution from the data perspective since the WUS will not interfere with the data as mentioned above. Furthermore, it is also a feasible solution from the WUS perspective provided that the WUS expansion is such that it is enough for detection to capture a portion of the expanded WUS corresponding to the WUS bandwidth, which may be achieved, for example, by repetition in the frequency domain.

Generally, the WUS is transmitted using a WUS transmission bandwidth, which is either equal to the WUS bandwidth or to the bandwidth of the frequency expanded version of the WUS, and the accumulated width of the guard bands and the WUS transmission bandwidth equals the non-data transmission bandwidth.

Also generally, the size of the non-data transmission bandwidth depends on the maximum reference frequency error. Typically, the non-data transmission bandwidth needs to be at least twice the pass band minus the WUS bandwidth, and the pass band is typically at least the WUS bandwidth plus twice the maximum reference frequency error. Consequently, a typical non-data transmission bandwidth may be the WUS bandwidth plus four times the maximum reference frequency error.

In the example situation when the network node uses an OFDM context for WUS transmission, the WUS may be generated by assigning a number of input taps of the IFFT to the WUS, wherein the number of input taps corresponds to the WUS bandwidth. Alternatively, the WUS may be generated separately and added to an, also separately generated, signal comprising data and having a signal gap equal to the non-data transmission bandwidth.

In the former example of WUS generation, the symbol rate of the WUS will typically be the same as the symbol rate of the OFDM system used for the data. The WUS may be generated using On-Off keying (OOK). This may be achieved by letting a logical zero be generated by blanking the subcarriers allocated to the WUS during the whole duration of one OFDM symbol (including the cyclic prefix), and by letting a logical one be generated by transmitting arbitrary constellation symbols (e.g. QAM symbols) having a predetermined (average) power during the duration of one OFDM symbol (including the cyclic prefix). In the WUR, concurrent transmission of WUS (using OOK) and data is typically perceived as the WUS employing Amplitude Shift Keying (ASK) and the data acting as a noise contributor.

Figure 4:
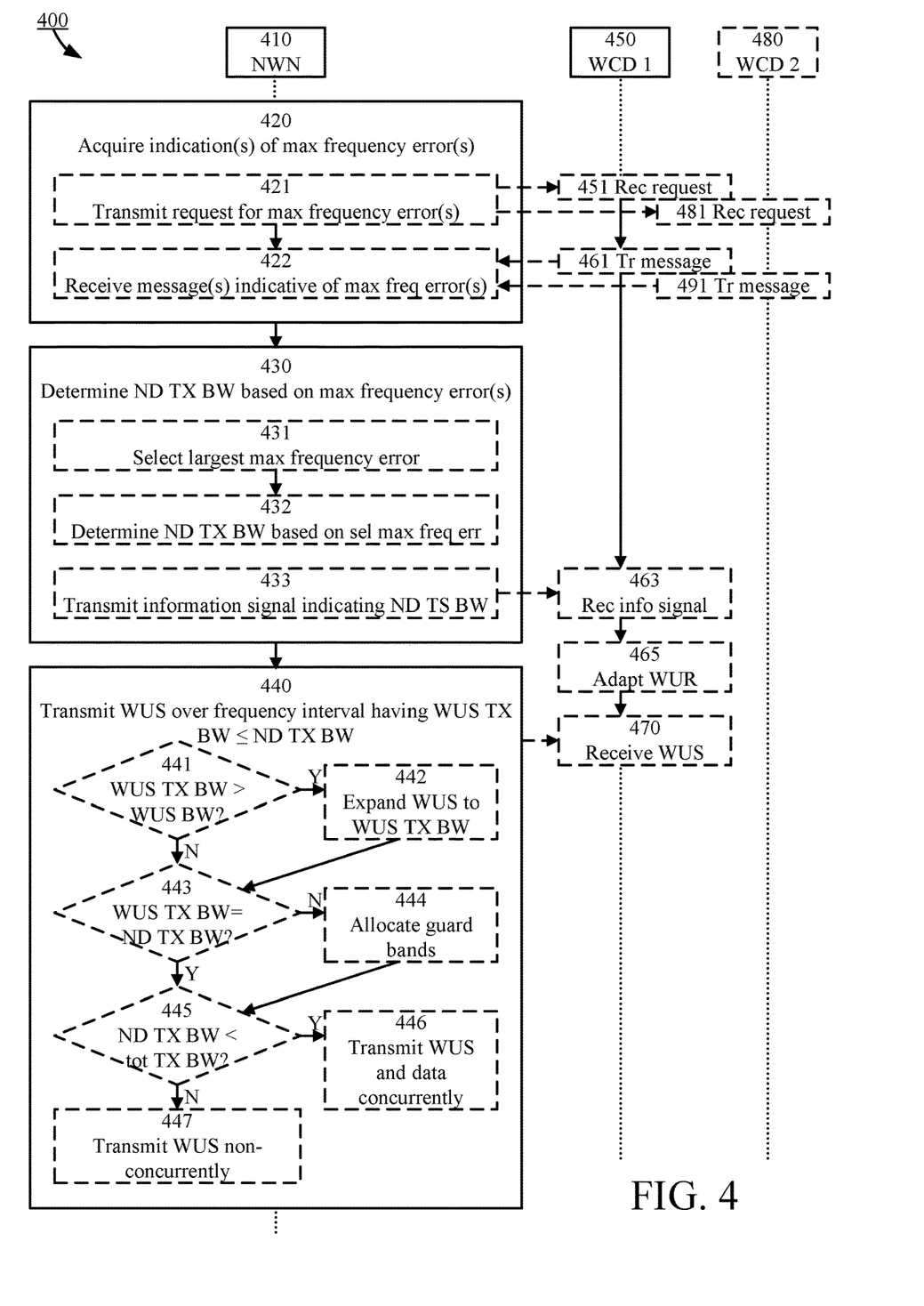
FIG. 4 is a combined flowchart and signaling diagram illustrating example method steps and signaling according to some embodiments.

FIG. 4 is a combined flowchart and signaling diagram illustrating example method steps and signaling according to some embodiments. An example method 400 is performed by a network node (NWN) 410, steps 451, 461, 463, 465 and 470 may be performed by a wireless communication device (WCD 1) 450 and steps 481 and 491 may be performed by one or more other wireless communication devices, represented by wireless communication device (WCD 2) 480.

The network node 410 may be adapted to transmit a WUS for waking up one or more wireless communication receivers (compare with 110, 120 of FIG. 1). Each of the one or more wireless communication receivers is comprised in a wireless communication device 450, 480 and is associated with a WUR (compare with 105 of FIG. 1) adapted to wake up the wireless communication receiver in response to detecting the WUS. The method 400 starts in step 420 where one or more indications of respective maximum frequency errors (compare with 333, 353 of FIG. 3) are acquired. Each maximum frequency error is for a respective WUR associated with a wireless communication receiver comprised in the wireless communication device. As mentioned before, each wireless communication device may comprise one or more wireless communication receivers. Further, each wireless communication device may comprise one or more WUR:s and each WUR may be associated with one or more wireless communication receiver. In some embodiments, a single WUR may have several possible parameter settings, resulting in different possible maximum frequency errors.

The maximum frequency errors to be acquired may, for example, be reported by respective wireless communication devices in any of a number of suitable ways as exemplified above (see also optional steps 422, 461, 491). As illustrated by optional steps 461, 491 and 422, the indication(s) of the maximum frequency error(s) may be acquired by receiving, 422, message(s) indicative of the maximum frequency error(s) and transmitted, 461, 491, from respective wireless communication devices.

In some embodiments, step 420 may further comprise transmitting (421) a request to one or more of the wireless communication devices to trigger the messages to be transmitted as a response to receiving the request as illustrated by steps 451 and 481.

With reference made to FIG. 3, and noting that a RU will typically contain either data only, WUS only, or nothing at all (neither data nor WUS), the granularity used for reporting frequency accuracy (or, correspondingly, maximum frequency error) may be aligned to the RU size according to some embodiments.

An alternative or additional approach to acquiring the maximum frequency errors in step 420 may comprise the network node transmitting the WUS and data concurrently with different set-ups (e.g. different non-data transmission bandwidths), and evaluate the result (e.g. whether or not the WUS has the desired effect of waking up a wireless communication receiver) to determine (or estimate) the maximum frequency error.

For example, since it is typically desirable to allocate as large as possible a portion of the total bandwidth to data, the network node may first send the WUS concurrently with data using a minimum non-data transmission bandwidth and increase the non-data transmission bandwidth for each required re-transmission of the WUS. In such an approach, the network node may retransmit the WUS until the intended WUR detects the WUS, and may then assume that the maximum frequency error of the WUR has a value that corresponds to the non-data transmission bandwidth used for the latest retransmission. In step 430, the network node determines a non-data transmission bandwidth (ND TX BW, compare with 354 of FIG. 3) based on the maximum frequency error(s), wherein the non-data transmission bandwidth is for exclusive use by the WUS. For example, the non-data transmission bandwidth may be determined as equal to, or larger than, the WUS bandwidth (compare with 311, 331, 351 of FIG. 3) plus four times the maximum frequency error. More generally, the non-data transmission bandwidth may be determined as equal to, or larger than, the bandwidth of a receiver filter of the WUR (compare with 330, 350 of FIG. 3) minus the WUS bandwidth.

The maximum frequency error used for the determination in step 430 is typically that of the WUR to which the WUS is to be transmitted. If the WUS is to be transmitted to several WUR:s, the determination of the non-data transmission bandwidth may comprise selecting the largest one of the respective maximum frequency errors as illustrated by optional step 431 and determining the non-data transmission bandwidth based on the selected maximum frequency error as illustrated by optional step 432.

In some embodiments (that may or may not be combined with the embodiments represented by steps 431 and 432), the network node transmits (433) an information signal to one or more of the wireless communication devices to inform them of which non-data transmission bandwidth it will use for WUS transmission. When the information signal is received at the wireless communication device (optional step 463), the device may adapt accordingly as illustrated by options step 465. Adaptation may, for example, comprise selecting one of a plurality of available WUR:s and/or using a particular parameter setting for a WUR.

A similar non-data transmission bandwidth information signal may optionally be used in step 420 if the WUS and data are transmitted concurrently with different set-ups to acquire the maximum frequency errors.

The WUS is then transmitted, in step 440, over a WUS transmission frequency interval having a WUS transmission bandwidth (WUS TX BW) that is less than, or equal to, the non-data transmission bandwidth. The WUS transmission may be received by one or more of the wireless communication devices as illustrated by optional step 470.

If the WUS transmission bandwidth (WUS TX BW) is larger than the WUS bandwidth (WUS BW)—Y-path out from optional step 441—then the WUS may be expanded in frequency to fill up the WUS transmission bandwidth as illustrated by optional step 442. For example, if an IFFT is used for generation of an OFDM signal including the WUS, the expansion may comprise increasing the number of input taps of the IFFT used for WUS to correspond to the WUS transmission bandwidth instead of to the WUS bandwidth. After expansion, as well as if the WUS transmission bandwidth is not larger than the WUS bandwidth—N-path out from optional step 441—the method may continue to optional step 443.

If the WUS transmission bandwidth (WUS TX BW) is equal to the non-data transmission bandwidth (ND TX BW)—Y-path out of optional step 443—the process continues directly to optional step 445. If the WUS transmission bandwidth (WUS TX BW) is not equal to (i.e. is less than) the non-data transmission bandwidth (ND TX BW)—N-path out of optional step 443—guard bands, wherein no signal is to be transmitted, are allocated on respective sides of the WUS in optional step 444 before the process continues to optional step 445. The widths of the guard bands plus the WUS transmission bandwidth equals the non-data transmission bandwidth. In the example situation when the network node uses an OFDM context for WUS transmission, the guard bands may be generated by assigning a number of input taps of the IFFT to guard bands (no signal, or zero, input), wherein the number of input taps correspond to the widths of the guard bands and are assigned on respective sides of input taps assigned to WUS.

In optional step 445 it is determined whether or not the non-data transmission bandwidth (ND TX BW) is smaller than a total transmission bandwidth (total TX BW; compare with 312, 332, 353 of FIG. 3) applied by the network node. If so—Y-path out from optional step 445—the WUS is transmitted concurrently with data as illustrated by optional step 446, otherwise—N-path out from optional step 445—the WUS is transmitted non-concurrently as illustrated by optional step 447.

Figure 5:
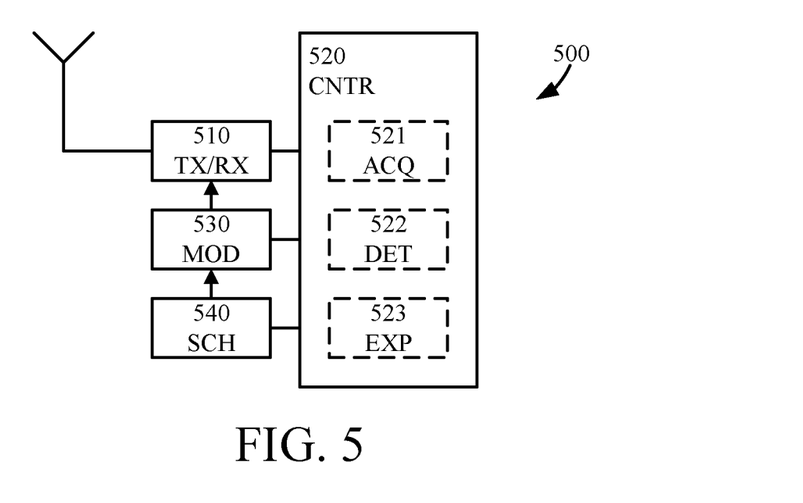
FIG. 5 is a schematic block diagram illustrating an example arrangement according to some embodiments.
Figure 6:
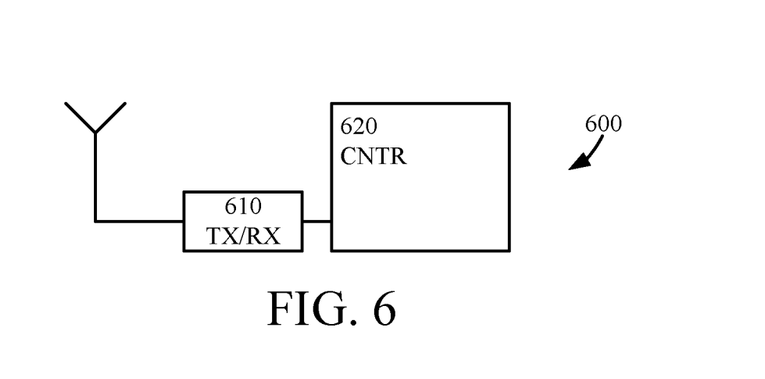
FIG. 6 is a schematic block diagram illustrating an example arrangement according to some embodiments.

FIG. 5 is a schematic illustration of an example arrangement 500 for a network node and FIG. 6 is a schematic illustration of an example arrangement 600 for a wireless communication device. For example, the arrangement 500 may be comprised in the network node 410 of FIG. 4 and the arrangement 600 may be comprised in one or more of the wireless communication devices 450, 480 of FIG. 4.

The arrangement 500 comprises a controller (CNTR) 520. The arrangement may also comprise, or may be associated with, a transceiver (TX/RX) 510, a modulator (MOD) 530, a scheduler (SCH) 540, an acquirer (ACQ) 521, a determiner (DET) 522 and an expander (EXP) 523, one or more of which may be comprised in, or associated with, the controller 520.

The controller is adapted to cause (compare with method 400—steps 420, 430, 440—of FIG. 4) acquiring of indications of maximum frequency errors of WUR:s, determination of a non-data transmission bandwidth based on the maximum frequency error, and transmission of the WUS over a WUS transmission bandwidth, which is less than, or equal to, the non-data transmission bandwidth.

Acquiring the indications may be performed by the acquirer 521 and/or the transceiver 510.

Determining the non-data transmission bandwidth (including selection of the largest maximum frequency error if applicable; compare with steps 431, 432 of FIG. 4) may be performed by the determiner 522.

Transmission of the WUS may be performed by the transceiver 510. The transmission of WUS may or may not be concurrent with data (compare with steps 440, 445, 446, 447 of FIG. 4). The signal for transmission may, for example, be generated by the modulator 530 using an IFFT where data, WUS, and (possibly) guard bands are allocated to the various RU:s/sub-carriers/input taps by the scheduler 540 as elaborated on above. Any expansion of the WUS (compare with steps 441, 442 of FIG. 4) may be handled by the expander 523 and/or the scheduler 540.

The arrangement 600 comprises a controller (CNTR) 620. The arrangement may also comprise, or may be associated with, a transceiver (TX/RX) 610. The controller is adapted to cause (compare with method steps 461, 470 of FIG. 4) transmission (by the transceiver 610) of a message indicative of the maximum frequency error of the WUR to the network node, and reception (by the transceiver 610) of the WUS from the network node.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device or a network node) comprising arrangements/circuitry/logic or performing methods according to any of the embodiments.

Figure 7:
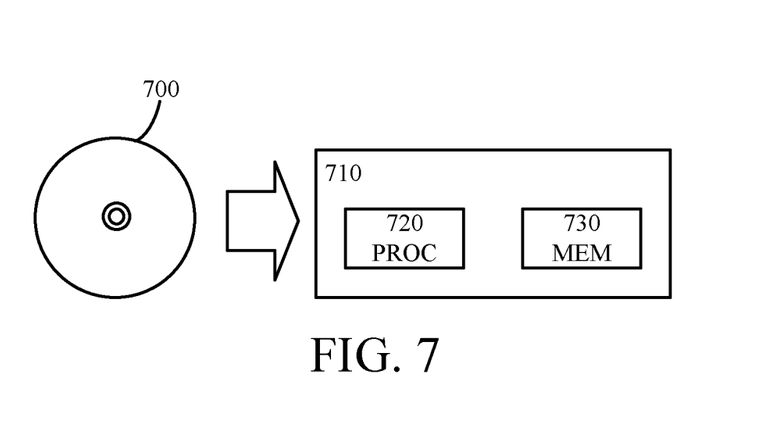
FIG. 7 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 700 illustrated in FIG. 7. The computer readable medium may have stored thereon a computer program comprising program instructions. The computer program may be loadable into a data-processing unit (PROC) 720, which may, for example, be comprised in a wireless communication device or a network node 710. When loaded into the data-processing unit, the computer program may be stored in a memory (MEM) 730 associated with or integral to the data-processing unit. According to some embodiments, the computer program may, when loaded into and run by the data-processing unit, cause execution of method steps according to, for example, the methods shown in FIG. 4.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method, of a network node adapted to transmit a wake-up signal, for waking up one or more wireless communication receivers, wherein the wake-up signal has a wake-up signal bandwidth, and wherein each of the one or more wireless communication receivers is comprised in a wireless communication device and is associated with a wake-up radio adapted to wake up the wireless communication receiver in response to detecting the wake-up signal, the method comprising:

acquiring, for at least one of the wireless communication devices, an indication of a maximum frequency error of the wake-up radio associated with the wireless communication receiver comprised in the wireless communication device;

determining, based on the maximum frequency error, a non-data transmission bandwidth for exclusive use by the wake-up signal;

transmitting the wake-up signal over a wake-up signal transmission frequency interval having a wake-up signal transmission bandwidth, wherein the wake-up signal transmission bandwidth is less than, or equal to, the non-data transmission bandwidth; and wherein the acquiring the indication of the maximum frequency error comprises receiving, from the at least one of the wireless communication devices, a message indicative of the maximum frequency error.

2. The method of claim 1, further comprising transmitting, to the at least one of the wireless communication devices, a request for the message indicative of the maximum frequency error.

3. The method of claim 1, wherein the determining the non-data transmission bandwidth comprises determining the non-data transmission bandwidth to be equal to, or larger than, the wake-up signal bandwidth plus four times the maximum frequency error.

4. The method of claim 1, further comprising transmitting data concurrently with the wake-up signal if the non-data transmission bandwidth is smaller than a total transmission bandwidth applied by the network node.

5. The method of claim 1, the method further comprising, when the wake-up signal bandwidth is smaller than the wake-up signal transmission bandwidth, expanding the wake-up signal to the wake-up signal transmission bandwidth before transmission.

6. The method of claim 1:
wherein the wake-up signal transmission bandwidth is less than the non-data transmission bandwidth;
further comprising allocating guard bands precluding signal transmission on respective sides of the wake-up signal transmission frequency interval, each guard band having a bandwidth; and
wherein the bandwidths of the guard bands plus the wake-up signal transmission bandwidth equals the non-data transmission bandwidth.

7. The method of claim 1:
wherein the acquiring the indication comprises acquiring a plurality of indications of respective maximum frequency errors of respective wake-up radios; and
wherein determining the non-data transmission bandwidth comprises selecting the largest one of the respective maximum frequency errors and determining the non-data transmission bandwidth based on the selected maximum frequency error.

8. The method of claim 1, further comprising transmitting an information signal to the at least one wireless communication device, the information signal indicating the non-data transmission bandwidth.

9. A method, of a wireless communication device adapted to receive a wake-up signal from a network node, for waking up a wireless communication receiver comprised in the wireless communication device, wherein the wireless communication receiver is associated with a wake-up radio comprised in the wireless communication device and adapted to wake up the wireless communication receiver in response to detecting the wake-up signal, the method comprising:
transmitting, to the network node, a message indicative of a maximum frequency error of the wake-up radio, wherein the maximum frequency error is for determination by the network node of a non-data transmission bandwidth for exclusive use by the wake-up signal; and
receiving, from the network node, a request for the message indicative of the maximum frequency error, wherein the transmitting the message is performed in response thereto.

10. The method of claim 9, further comprising:
receiving an information signal from the network node, the information signal indicating the non-data transmission bandwidth; and
adapting one or more wake-up radio parameters based on the non-data transmission bandwidth.

11. The method of claim 9, further comprising receiving the wake-up signal in a wake-up signal transmission frequency interval having a wake-up signal transmission bandwidth; wherein the wake-up signal transmission bandwidth is less than, or equal to, the non-data transmission bandwidth.

12. An arrangement for a network node adapted to transmit a wake-up signal for waking up one or more wireless communication receivers, wherein the wake-up signal has a wake-up signal bandwidth, and wherein each of the one or more wireless communication receivers is comprised in a wireless communication device and is associated with a wake-up radio adapted to wake up the wireless communication receiver in response to detecting the wake-up signal, the arrangement comprising:
processing circuitry;
memory containing instructions executable by the processing circuitry whereby the arrangement is operative to:
acquire, for at least one of the wireless communication devices, an indication of a maximum frequency error of the wake-up radio associated with the wireless communication receiver comprised in the wireless communication device;
determine, based on the maximum frequency error, a non-data transmission bandwidth for exclusive use by the wake-up signal; and
transmit the wake-up signal over a wake-up signal transmission frequency interval having a wake-up signal transmission bandwidth, wherein the wake-up signal transmission bandwidth is less than, or equal to, the non-data transmission bandwidth; and
acquire the indication of the maximum frequency error by receiving, from the at least one of the wireless communication devices, a message indicative of the maximum frequency error.

13. The arrangement of claim 12, wherein the instructions are such that the arrangement is operative to transmit, to the at least one of the wireless communication devices, a request for the message indicative of the maximum frequency error.

14. The arrangement of claim 12, wherein the instructions are such that the arrangement is operative to determine the non-data transmission bandwidth by determining the non-data transmission bandwidth to be equal to, or larger than, the wake-up signal bandwidth plus four times the maximum frequency error.

15. The arrangement of claim 12, wherein the instructions are such that the arrangement is operative to transmit data concurrently with the wake-up signal if the non-data transmission bandwidth is smaller than a total transmission bandwidth applied by the network node.

16. The arrangement of claim 12, wherein the instructions are such that the arrangement is operative to, when the wake-up signal bandwidth is smaller than the wake-up signal transmission bandwidth, expand the wake-up signal to the wake-up signal transmission bandwidth before transmission.

17. The arrangement of claim 12:
wherein the wake-up signal transmission bandwidth is less than the non-data transmission bandwidth;
wherein the instructions are such that the arrangement is operative to allocate guard bands precluding signal transmission on respective sides of the wake-up signal transmission frequency interval, each guard band having a bandwidth; and wherein the bandwidths of the guard bands plus the wake-up signal transmission bandwidth equals the non-data transmission bandwidth.

18. The arrangement of claim 12, wherein the instructions are such that the arrangement is operative to:

acquire a plurality of indications of respective maximum frequency errors of respective wake-up radios;

determine the non-data transmission bandwidth by selecting the largest one of the respective maximum frequency errors; and determine of the non-data transmission bandwidth based on the selected maximum frequency error.

19. The arrangement of claim 12, wherein the instructions are such that the arrangement is operative to transmit an information signal to the at least one wireless communication device, the information signal indicating the non-data transmission bandwidth.

20. An arrangement for a wireless communication device adapted to receive a wake-up signal from a network node for waking up a wireless communication receiver comprised in the wireless communication device, wherein the wireless communication receiver is associated with a wake-up radio comprised in the wireless communication device and adapted to wake up the wireless communication receiver in response to detecting the wake-up signal, the arrangement comprising:

processing circuitry;

memory containing instructions executable by the processing circuitry whereby the arrangement is operative to:

transmit, to the network node, a message indicative of a maximum frequency error of the wake-up radio, wherein the maximum frequency error is for determination by the network node of a non-data transmission bandwidth for exclusive use by the wake-up signal; and receive, from the network node, a request for the message indicative of the maximum frequency error, and perform the transmission of the message in response thereto.

21. The arrangement of claim 20, wherein the instructions are such that the arrangement is operative to:

receive an information signal from the network node, the information signal indicating the non-data transmission bandwidth; and adapt one or more wake-up radio parameters based on the non-data transmission bandwidth.

22. The arrangement of claim 20, wherein the instructions are such that the arrangement is operative to receive the wake-up signal in a wake-up signal transmission frequency interval having a wake-up signal transmission bandwidth, wherein the wake-up signal transmission bandwidth is less than, or equal to, the non-data transmission bandwidth.

* * * * *

UNITED STATES PATENT AND TRADEMARK OFFICE
CERTIFICATE OF CORRECTION

PATENT NO. : 10,939,372 B2
APPLICATION NO. : 16/479249
DATED : March 2, 2021
INVENTOR(S) : Wilhelmsson et al.

Page 1 of 1

It is certified that error appears in the above-identified patent and that said Letters Patent is hereby corrected as shown below:

In the Specification

In Column 8, Line 53, delete "filer" and insert -- filter --, therefor.

In the Claims

In Column 17, Line 14, in Claim 18, delete "determine of the" and insert -- determine the --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*